(12) United States Patent
Huo

(10) Patent No.: US 12,288,505 B2
(45) Date of Patent: Apr. 29, 2025

(54) DRIVING CIRCUIT, DISPLAY PANEL, AND DRIVING METHOD THEREOF

(71) Applicant: TCL CHINA STAR OPTOELECTRONICS TECHNOLOGY CO., LTD., Guangdong (CN)

(72) Inventor: Wenxue Huo, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,465

(22) PCT Filed: May 17, 2022

(86) PCT No.: PCT/CN2022/093308
§ 371 (c)(1),
(2) Date: May 25, 2022

(87) PCT Pub. No.: WO2023/206637
PCT Pub. Date: Nov. 2, 2023

(65) Prior Publication Data
US 2024/0169892 A1    May 23, 2024

(30) Foreign Application Priority Data
Apr. 27, 2022  (CN) .......................... 202210458165.8

(51) Int. Cl.
G09G 3/32          (2016.01)
(52) U.S. Cl.
CPC ....... *G09G 3/32* (2013.01); *G09G 2320/0233* (2013.01); *G09G 2320/0633* (2013.01)

(58) Field of Classification Search
CPC ............. G09G 3/32; G09G 2320/0233; G09G 2320/0633
See application file for complete search history.

(56) References Cited

U.S. PATENT DOCUMENTS

2018/0301080 A1* 10/2018 Shigeta ................... G09G 3/32
2019/0371231 A1* 12/2019 Kim ...................... G09G 3/2081
2022/0114951 A1   4/2022 Chang et al.

FOREIGN PATENT DOCUMENTS

CN      108735143 A      11/2018
CN      110556072 A      12/2019
(Continued)

OTHER PUBLICATIONS

International Search Report in International application No. PCT/CN2022/093308, mailed on Nov. 28, 2022.
(Continued)

*Primary Examiner* — Michael Pervan

(57) ABSTRACT

A driving circuit, a display panel, and a driving method thereof are disclosed. The driving circuit includes a light-emitting module, a data signal writing module, and a control module. The light-emitting module emits light under a driving current. The data signal writing module is connected to the light-emitting module and configured to control a magnitude of the driving current. The control module is electrically connected to the data signal writing module and the light-emitting module. The control module is configured to control a light-emitting time of the light-emitting module under a control of a light-emitting time control signal.

12 Claims, 4 Drawing Sheets

(56) References Cited

FOREIGN PATENT DOCUMENTS

| CN | 111028776 A | 4/2020 |
|----|-------------|--------|
| CN | 114241976 A | 3/2022 |
| TW | I719815 B   | 2/2021 |

OTHER PUBLICATIONS

Written Opinion of the International Search Authority in International application No. PCT/CN2022/093308, mailed on Nov. 28, 2022.
Chinese Office Action issued in corresponding Chinese Patent Application No. 202210458165.8 dated Nov. 14, 2022, pp. 1-10.

\* cited by examiner

DRIVING CIRCUIT, DISPLAY PANEL, AND DRIVING METHOD THEREOF

FIELD OF THE DISCLOSURE

The present application relates to the field of display technologies, and more particularly, to a driving circuit, a display panel, and a driving method thereof.

BACKGROUND

Light-emitting diodes may shift their luminous waves at different current densities. Specifically, a pulse amplitude modulation driving circuit is used to control an amplitude of a driving current of the light-emitting diode. That is, a brightness is controlled by a magnitude of the current, but a threshold voltage drift of a driving transistor may cause the current change to cause a color shift issue. Another type of pulse width modulation driving circuit is also used in the prior art. The brightness of the light-emitting diode is controlled by controlling a light-emitting time of the light-emitting diode, and the light-emitting diode is dimmed. However, a threshold voltage drift of its driving transistor may cause a change of the light-emitting time. The pulse width modulation drive circuit can solve the color shift issue of light-emitting diodes. The drives are efficient and can be precisely controlled. However, a compensation range for the driving circuit is small, and the occupied time is long, which is not conducive to ensuring the lighting duration of the driving circuit.

Therefore, there is an urgent need to provide a driving circuit, which can realize a mixed driving of pulse amplitude modulation and pulse width modulation, so that a pulse width modulation module has an internal compensation function, and a pulse amplitude modulation module has an external compensation function.

SUMMARY

Technical Problem

The present application provides a driving circuit, a display panel, and a driving method thereof, which can realize a mixed driving of pulse amplitude modulation and pulse width modulation and enable a control module to have an internal compensation function, and a light-emitting module to have an external compensation function.

Technical Solution

On the one hand, an embodiment of the present application provides a driving circuit, including: a light-emitting module, a data signal writing module, and a control module, the light-emitting module emits light under a driving of a driving current; the data signal writing module is connected to the light-emitting module and is configured to control a magnitude of the driving current; the control module is configured to receive a second data signal, a light-emitting time control signal, a second scan signal, and a third scan signal and is electrically connected to the data signal writing module and the light-emitting module, and the control module is configured to control a light-emitting time of the light-emitting module under a control of the light-emitting time control signal.

Optionally, in some embodiments of the present application, the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node; an anode of the light-emitting device is electrically connected to the second node, and a cathode of the light-emitting device is electrically connected to a second power supply terminal.

Optionally, in some embodiments of the present application, the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node.

Optionally, in some embodiments of the present application, the control module comprises a second capacitor, a third transistor, a fourth transistor, and a fifth transistor, one end of the second capacitor is configured to receive the light-emitting time control signal, and another end of the second capacitor is electrically connected to the third node; a gate of the third transistor is configured to receive the second scan signal, a first electrode of the third transistor is electrically connected to the third node, and a second electrode of the third transistor is electrically connected between the data signal writing module and the light-emitting module; a gate of the fourth transistor is electrically connected to the third node, a first electrode of the fourth transistor is electrically connected to the fourth node, and a second electrode of the fourth transistor is electrically connected to a second electrode of the third transistor is electrically connected; a gate of the fifth transistor is configured to receive the third scan signal, a first electrode of the fifth transistor is configured to receive the second data signal, and a second electrode of the fifth transistor is electrically connected to the fourth node.

Optionally, in some embodiments of the present application, the light-emitting module further comprises a threshold voltage detection sub-module, the threshold voltage detection sub-module is configured to receive a fourth scan signal and a third data signal, and the threshold voltage detection sub-module is configured to detect a threshold voltage of the first transistor and compensate for a data voltage corresponding to the first data signal.

Optionally, in some embodiments of the present application, the threshold voltage detection sub-module comprises a sixth transistor, a gate of the sixth transistor is connected to the fourth scan signal, a first electrode of the sixth transistor is configured to receives the third data signal, and a second electrode of the sixth transistor is electrically connected to the second node.

Optionally, in some embodiments of the present application, the first electrode of the second transistor and the first electrode of the fifth transistor are electrically connected to a fifth node, and the first data signal and the second data signal are a same signal.

Optionally, in some embodiments of the present application, the first transistor, the second transistor, the third transistor, the fourth transistor, and the fifth transistor are transistors of a same type.

The present application further provides a display panel, which includes a plurality of pixel units arranged in an array, the pixel units include a driving circuit, and the driving circuit includes: a light-emitting module, wherein the light-emitting module emits light under a driving of a driving current; a data signal writing module configured to receive a first data signal and a first scan signal, wherein the data signal writing module is connected to the light-emitting module and is configured to control a magnitude of the driving current; and a control module configured to receive a second data signal, a light-emitting time control signal, a second scan signal, and a third scan signal and electrically connected to the data signal writing module and the light-emitting module, wherein the control module is configured to control a light-emitting time of the light-emitting module under a control of the light-emitting time control signal.

Optionally, in some embodiments of the present application, the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node; an anode of the light-emitting device is electrically connected to the second node, and a cathode of the light-emitting device is electrically connected to a second power supply terminal.

Optionally, in some embodiments of the present application, the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node.

Optionally, in some embodiments of the present application, the control module comprises a second capacitor, a third transistor, a fourth transistor, and a fifth transistor, one end of the second capacitor is configured to receive the light-emitting time control signal, and another end of the second capacitor is electrically connected to the third node; a gate of the third transistor is configured to receive the second scan signal, a first electrode of the third transistor is electrically connected to the third node, and a second electrode of the third transistor is electrically connected between the data signal writing module and the light-emitting module; a gate of the fourth transistor is electrically connected to the third node, a first electrode of the fourth transistor is electrically connected to the fourth node, and a second electrode of the fourth transistor is electrically connected to a second electrode of the third transistor is electrically connected; a gate of the fifth transistor is configured to receive the third scan signal, a first electrode of the fifth transistor is configured to receive the second data signal, and a second electrode of the fifth transistor is electrically connected to the fourth node.

Optionally, in some embodiments of the present application, the light-emitting module further comprises a threshold voltage detection sub-module, the threshold voltage detection sub-module is configured to receive a fourth scan signal and a third data signal, and the threshold voltage detection sub-module is configured to detect a threshold voltage of the first transistor and compensate for a data voltage corresponding to the first data signal.

Optionally, in some embodiments of the present application, the threshold voltage detection sub-module comprises a sixth transistor, a gate of the sixth transistor is connected to the fourth scan signal, a first electrode of the sixth transistor is configured to receives the third data signal, and a second electrode of the sixth transistor is electrically connected to the second node.

Optionally, in some embodiments of the present application, the first electrode of the second transistor and the first electrode of the fifth transistor are electrically connected to a fifth node, and the first data signal and the second data signal are a same signal.

Optionally, in some embodiments of the present application, the first transistor, the second transistor, the third transistor, the fourth transistor, and the fifth transistor are transistors of a same type.

On the other hand, the present application provides a driving method of a display panel, the display panel includes a plurality of pixel units arranged in an array, the pixel units include a driving circuit, and the driving method of the driving circuit includes: controlling a conduction of a data signal writing module through a first data signal and a first scan signal, wherein the data signal writing module is connected to a light-emitting module and configured to control a magnitude of a driving current; controlling a conduction of a control module through a second data signal, a light-emitting time control signal, a second scan signal, and a third scan signal, wherein the control module is electrically connected to the data signal writing module and the light-emitting module, and the control module is configured to control a light-emitting time of the light-emitting module under a control of the light-emitting time control signal; and driving the light-emitting module to emit light by the driving current.

Optionally, in some embodiments of the present application, the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node; an anode of the light-emitting device is electrically connected to the second node, and a cathode of the light-emitting device is electrically connected to a second power supply terminal.

Optionally, in some embodiments of the present application, the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node.

Optionally, in some embodiments of the present application, the control module comprises a second capacitor, a third transistor, a fourth transistor, and a fifth transistor, one end of the second capacitor is configured to receive the light-emitting time control signal, and another end of the second capacitor is electrically connected to the third node; a gate of the third transistor is configured to receive the second scan signal, a first electrode of the third transistor is electrically connected to the third node, and a second electrode of the third transistor is electrically connected between the data signal writing module and the light-emitting module; a gate of the fourth transistor is electrically connected to the third node, a first electrode of the fourth transistor is electrically connected to the fourth node, and a second electrode of the fourth transistor is electrically connected to a second electrode of the third transistor is electrically connected; a gate of the fifth transistor is configured to receive the third scan signal, a first electrode of the fifth transistor is configured to receive the second data signal, and a second electrode of the fifth transistor is electrically connected to the fourth node.

Advantageous Effect

The present application provides a driving circuit, a display panel, and a driving method thereof. The light-emitting module emits light when driven by a driving current. The data signal writing module is connected to the first data signal and the first scan signal. The data signal writing module is connected to the light-emitting module and used to control the magnitude of the driving current. The control module is connected to the second data signal, the light-emitting time control signal, the second scan signal, and the third scan signal, and is electrically connected to the data signal writing module and the light-emitting module. The control module is configured to control the light-emitting time of the light-emitting module under the control of the light-emitting time control signal. This can realize a mixed driving of pulse amplitude modulation and pulse width modulation and enable the control module to have an internal compensation function, and the light-emitting module to have an external compensation function.

BRIEF DESCRIPTION OF THE DRAWINGS

In order to illustrate the technical solutions in the embodiments of the present application more clearly, the following briefly introduces the accompanying drawings that need to be used in the description of the embodiments. Obviously, the drawings in the following description are only some embodiments of the present application. For those skilled in the art, other drawings can also be obtained from these drawings without creative effort.

DETAILED DESCRIPTION

Figure 1:
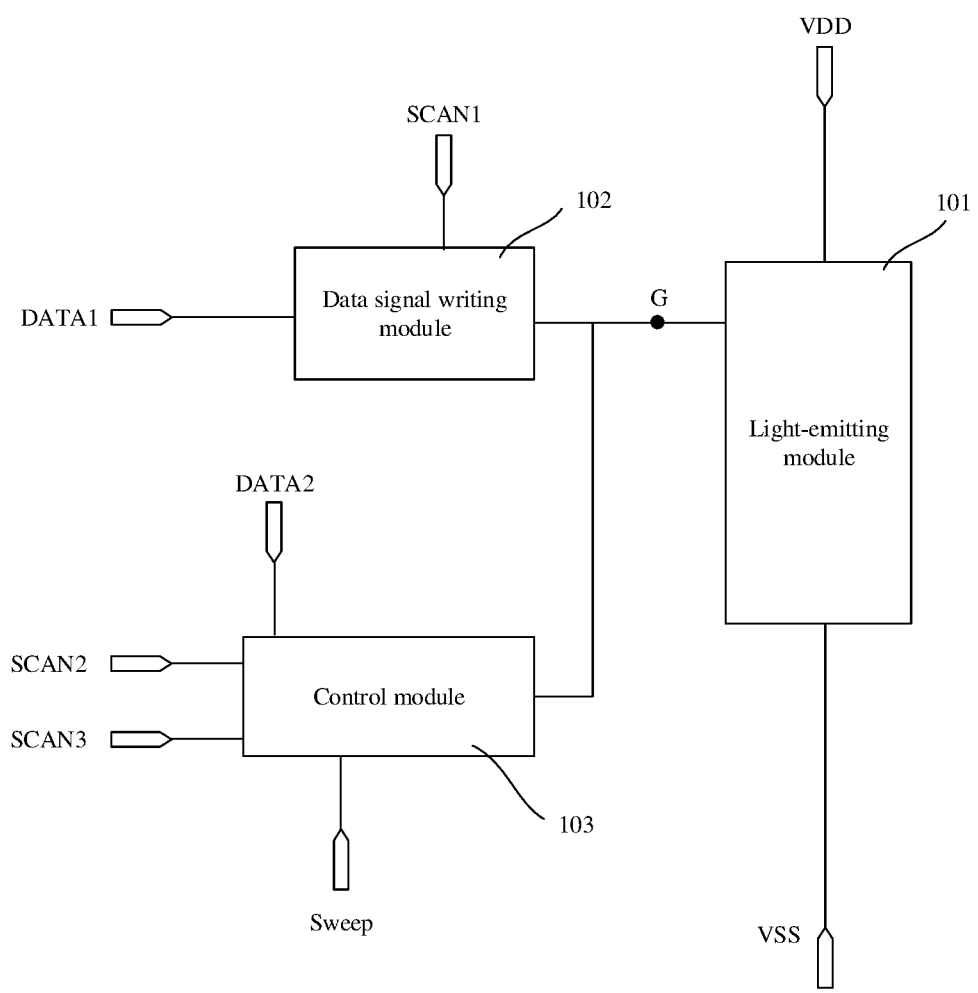
FIG. 1 is a schematic structural diagram of a driving circuit provided by a first embodiment of the present application.

In order to make the objectives, technical solutions, and effects of the present application clearer, the present application will be further described in detail below with reference to the accompanying drawings and examples. It should be understood that the specific embodiments described herein are only used to explain the present application, but not to limit the present application.

Embodiments of the present application provide a driving circuit, a display panel, and a driving method thereof. The GOA circuit has a simple structure and can reduce a circuit layout space under a condition of ensuring a circuit function. An aperture ratio of the display panel is increased to meet requirements of a narrow frame and high resolution of the display panel. Each of them will be described in detail below. It should be noted that the description order of the following embodiments is not intended to limit the preferred order of the embodiments. In addition, in the description of this application, the term "including" means "including but not limited to". The terms "first," "second," "third," etc. are used merely as labels to distinguish between different objects, rather than to describe a particular order.

The transistors used in all the embodiments of the present application may be thin film transistors or field effect transistors or other devices with the same characteristics. Because the source and the drain of the transistor used here are symmetrical, the source and the drain are interchangeable. In the description of the present application, the middle terminal of the switching transistor is the gate, the signal input terminal is the drain, and the output terminal is the source according to the form in the drawings. It can be understood that those skilled in the art can refer to the signal input terminal as the source and the signal output terminal as the drain according to their understanding. In addition, the transistors used in the embodiments of the present application are N-type transistors or P-type transistors. An N-type transistor is turned on when the gate is at a high potential and turned off when the gate is at a low potential. A P-type transistor is turned on when the gate is at a low potential and turned off when the gate is at a high potential. In the embodiments of the present application, the light-emitting device D may be a mini light-emitting diode (Mini LED for short), a micro light-emitting diode (Micro LED for short), or an organic light-emitting diode (OLED for short).

Figure 2:
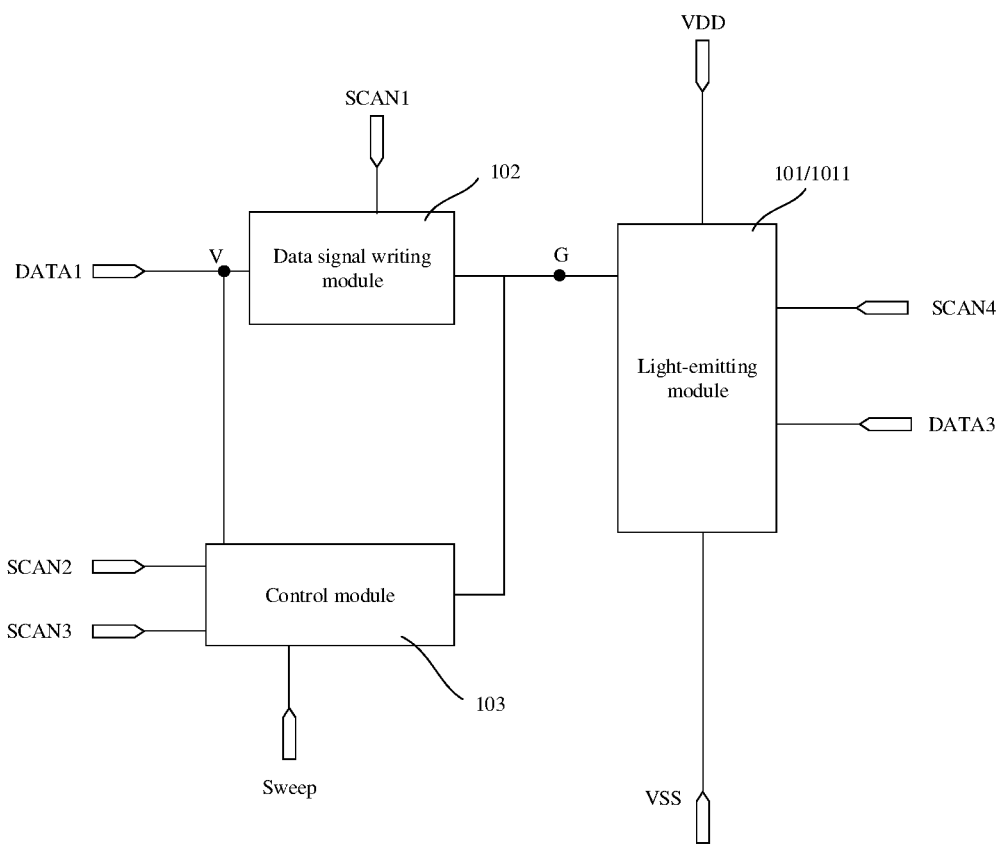
FIG. 2 is a schematic structural diagram of a driving circuit according to a second embodiment of the present application.

Refer to FIG. 1, FIG. 1 is a schematic structural diagram of a driving circuit according to a first embodiment of the present application. FIG. 2 is a schematic structural diagram of a driving circuit according to a second embodiment of the present application. As shown in FIG. 1, the driving circuit provided by the embodiment of the present application includes a light-emitting module 101, a data signal writing module 102, and a control module 103.

The light-emitting module 101 is connected in series to a light-emitting loop formed by a first power supply terminal VDD and a second power supply terminal VSS and emits light under a driving current. The data signal writing module 102 is connected to a first data signal DATA1 and a first scan signal SCAN1, and is electrically connected to a first node G. The data signal writing module 102 is connected to the light-emitting module 101 and used to control a magnitude of the driving current. The control module 103 is connected to a second data signal DATA2, a light-emitting time control signal Sweep, a second scan signal SCAN2, and a third scan signal SCAN3, and is electrically connected to the data signal writing module 102 and the light-emitting module 101. The control module 103 is configured to control a light-emitting time of the light-emitting module 101 under a control of the light-emitting time control signal Sweep.

In this embodiment of the present application, as shown in FIG. 2, the light-emitting module 101 further includes a threshold voltage detection sub-module 1011. The threshold voltage detection sub-module 1011 is connected to a fourth scan signal SCAN4 and the third data signal DATA3. The threshold voltage detection sub-module 1011 is used for detecting the magnitude of the threshold voltage and compensating the data voltage corresponding to the first data signal DATA1 based on the threshold voltage value.

In this embodiment of the present application, as shown in FIG. 2, the first data signal DATA1 and the second data signal DATA2 are the same signal.

The driving circuit provided in the present application includes a control module 103 and a threshold voltage detection sub-module 1011 that are independent of each other. The light-emitting time of the light-emitting module 101 is controlled by the control module 103, and internal compensation is performed to improve a display uniformity. The threshold voltage of the first transistor T1 is detected by the threshold voltage detection sub-module 1011, and the data voltage corresponding to the first data signal DATA1 is compensated. This further realizes a mixed driving of pulse width modulation and pulse amplitude modulation.

Figure 3:
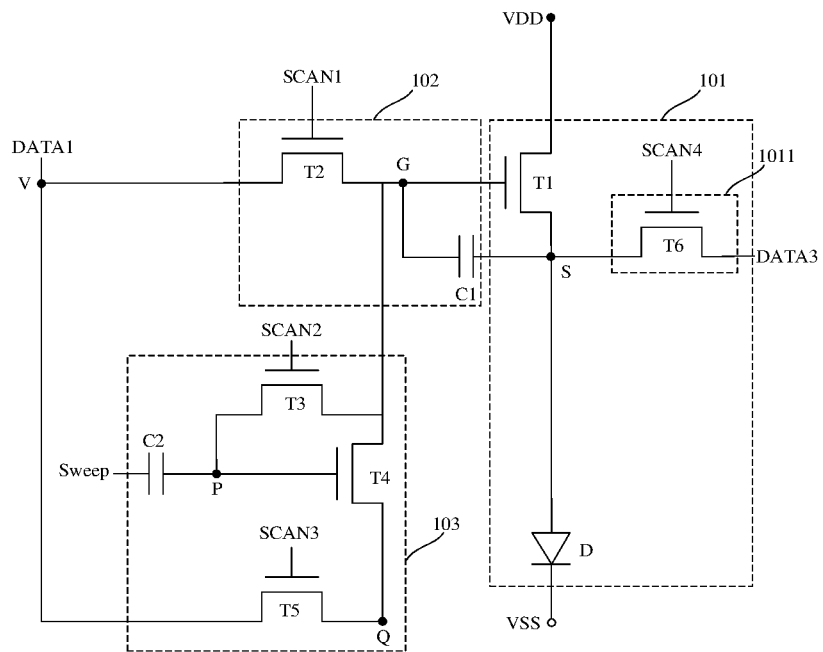
FIG. 3 is a circuit diagram of a driving circuit provided by a second embodiment of the present application.

Refer to FIG. 3, which is a circuit diagram of a driving circuit provided by a second embodiment of the present application. As shown in FIG. 3, the driving circuit provided by the embodiment of the present application includes that: the light-emitting module 101 includes a first transistor T1 and a light-emitting device D; the data signal writing module 102 includes a second transistor T2 and a first capacitor C1; the control module 103 includes a third transistor T3, a fourth transistor T4, a fifth transistor T5, and a second capacitor C2; the light-emitting module 101 further includes a threshold voltage detection sub-module 1011, and the threshold voltage detection sub-module 1011 includes a sixth transistor T6.

Specifically, the first electrode of the first transistor T1 is electrically connected to the first power supply terminal VDD. The gate of the first transistor T1 is electrically connected to the first node G. The second electrode of the first transistor T1 is electrically connected to the second node S. The gate of the second transistor T2 is connected to the first scan signal SCAN1. The first electrode of the second transistor T2 and the first electrode of the fifth transistor are electrically connected to the fifth node V for accessing the first data signal DATA1. The second electrode of the second transistor T2 is connected to the first node G. The gate of the third transistor T3 is connected to the second scan signal SCAN2. The first electrode of the third transistor T3 is electrically connected to the third node P. The second electrode of the third transistor T3 is electrically connected between the data signal writing module 102 and the light-emitting module 101. The gate of the fourth transistor T4 is electrically connected to the third node P. The first electrode of the fourth transistor T4 is electrically connected to the fourth node Q. The second electrode of the fourth transistor T4 is electrically connected to the second electrode of the third transistor T3. The gate of the fifth transistor T5 is connected to the third scan signal SCANS. The first electrode of the fifth transistor T5 is connected to the first data signal DATA1. The second electrode of the fifth transistor T5 is electrically connected to the fourth node Q. The gate of the sixth transistor T6 is connected to the fourth scan signal SCAN4. The first electrode of the sixth transistor T6 is connected to the second data signal DATA2. The second electrode of the sixth transistor T6 is electrically connected to the second node S. One end of the first capacitor C1 is electrically connected to the first node G. The other end of the first capacitor C1 is electrically connected to the second node S. One end of the second capacitor C2 is connected to the light-emitting time control signal Sweep. The other end of the second capacitor C2 is electrically connected to the third node P. The anode of the light-emitting device D is electrically connected to the second node S. The cathode of the light-emitting device D is electrically connected to the second power supply terminal VSS.

It should be noted that the first power supply terminal VDD and the second power supply terminal VSS are both used for outputting a predetermined voltage value. In addition, in the embodiment of the present application, the potential of the first power supply terminal VDD is greater than the potential of the second power supply terminal VSS. Specifically, the potential of the second power supply terminal VSS may be the potential of the ground terminal. It can be understood that the potential of the second power supply terminal VSS can also be other.

In the embodiment of the present application, the first transistor T1, the second transistor T2, the third transistor T3, the fourth transistor T4, the fifth transistor T5, and the sixth transistor T6 are transistors of the same type. Specifically, the first transistor T1, the second transistor T2, the third transistor T3, the fourth transistor T4, the fifth transistor T5, and the sixth transistor T6 are all P-type transistors or N-type transistors. It can be understood that, as allowed by the efficiency of the manufacturing process, the respective transistors may also be transistors of different types.

It should be noted that the first transistor T1, the second transistor T2, the third transistor T3, the fourth transistor T4, the fifth transistor T5, and the sixth transistor T6 may be one or more of low temperature polysilicon thin film transistors, oxide semiconductor thin film transistors, amorphous silicon thin film transistors, and field effect transistors.

The driving circuit provided by the embodiment of the present application improves the display uniformity by controlling the light-emitting time of the light-emitting device D and performing internal compensation on the threshold voltage of the fourth transistor T4. In addition, by controlling the size of the driving current flowing through the light-emitting device D and externally compensating the threshold voltage of the first transistor T1, the mixed driving of pulse width modulation and pulse amplitude modulation is realized, and the product competitiveness is improved.

Figure 4:
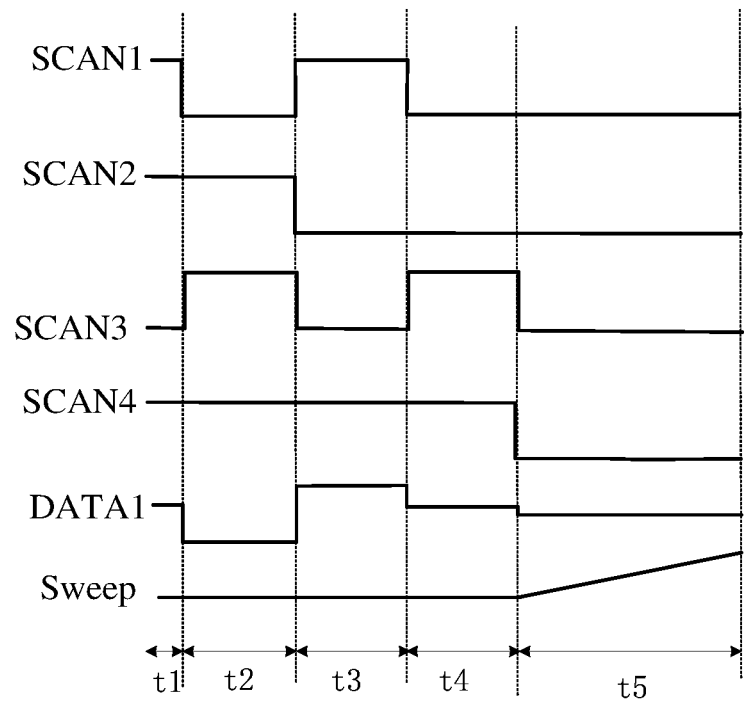
FIG. 4 is a first timing diagram of the driving circuit provided by the second embodiment of the present application.
Figure 5:
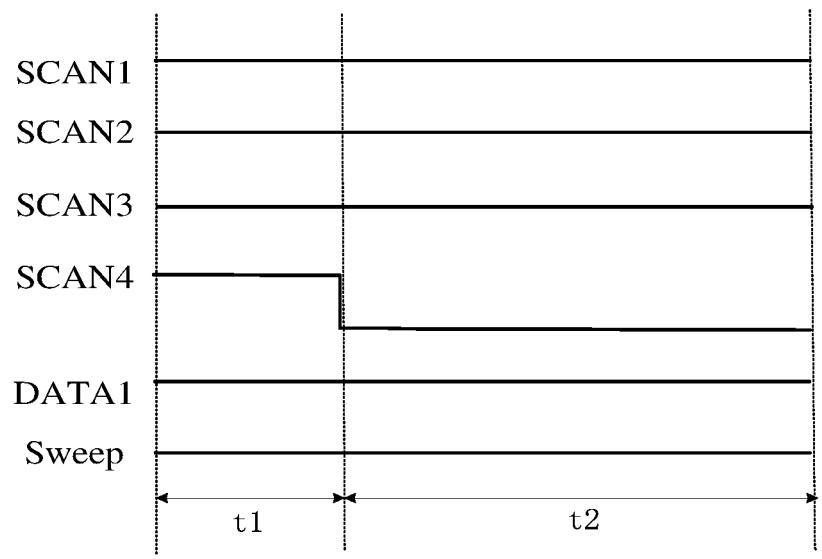
FIG. 5 is a second timing diagram of the driving circuit provided by the second embodiment of the present application.

Refer to FIG. 4 and FIG. 5, FIG. 4 is a first timing diagram of the driving circuit provided by the second embodiment of the present application. FIG. 5 is a second timing diagram of the driving circuit provided by the second embodiment of the present application. As shown in FIG. 4, on the one hand, the control module 103 can control the light-emitting time by compensating for the threshold voltage of the fourth transistor T4. The internal compensation process includes a first write compensation stage t1, a second write compensation stage t2, a third writing compensation stage t3, a fourth writing compensation stage, and a light-emitting stage t5 corresponding to the combination of the first scan signal SCAN1, the second scan signal SCAN2, the third scan signal SCAN3, the fourth scan signal SCAN4, and the light-emitting time control signal Sweep. That is, within one frame time, the driving control sequence of the driving circuit provided by the embodiment of the present application includes a first writing compensation stage t1, a second writing compensation stage t2, a third writing compensation stage t3, a fourth writing compensation stage, and a light-emitting stage t5. It should be noted that the light-emitting device D emits light in the light-emitting stage t5.

Specifically, as shown in FIG. 3 and FIG. 4, in the first writing compensation stage t1, the third scan signal SCAN3 is at a low level, the first scan signal SCAN1, the second scan signal SCAN2, and the fourth scan signal SCAN4 are at a high level, and the magnitude of the first data signal DATA1 is the first voltage.

The first scan signal SCAN1 is at a high potential, and the second transistor T2 is turned on under the control of the high potential of the first scan signal SCAN1, so that the potential of the first node G is charged to the first voltage through the first data signal DATA1. The second scan signal SCAN2 is at a high potential, and the third transistor T3 is turned on under the control of the high potential of the second scan signal SCAN2, so that the potential of the third node P is charged to the first voltage through the first data signal DATA1. The fourth scan signal SCAN4 is at a high level, and the sixth transistor T6 is turned on under the control of the high level of the fourth scan signal SCAN4, so as to transmit the third data signal DATA3 to the second node S.

In the second writing compensation stage t2, the first scan signal SCAN1 is at a low level, the second scan signal SCAN2, the third scan signal SCAN3, and the fourth scan signal SCAN4 are at a high level, and the magnitude of the first data signal DATA1 is the second voltage.

The second scan signal SCAN2 is at a high level, and the third transistor T3 is turned on under the control of the high level of the second scan signal SCAN2. The gate of the fourth transistor T4 and the second electrode of the fourth transistor T4 are short-circuited through the turned-on third transistor T3 and are in a floating state. The third scan signal SCAN3 is at a high level, and the fifth transistor T5 is turned on under the control of the high level of the third scan signal SCAN3. Therefore, the potential of the fourth node Q is charged to the second voltage and maintained by the first data signal DATA1. When the gate terminal voltage flowing through the fourth transistor T4 becomes the sum of the second voltage and the threshold voltage of the fourth transistor T4, the fourth transistor T4 is turned off. The voltage difference between the gate (third node P) and the source (fourth node Q) of the fourth transistor T4 is the threshold voltage of the fourth transistor T4. Therefore, the magnitude of the current flowing between the source and drain of the fourth transistor T4 is independent of the threshold voltage of the fourth transistor T4, so as to complete the internal compensation of the fourth transistor T4. In addition, the fourth scan signal SCAN4 is at a high level, and the sixth transistor T6 is turned on under the control of the high level of the fourth scan signal SCAN4, so as to transmit the third data signal DATA3 to the second node S.

In the third writing compensation stage t3, the second scan signal SCAN2 and the third scan signal SCAN3 are at a low level, the first scan signal SCAN1 and the fourth scan signal SCAN4 are at a high level, and the magnitude of the first data signal DATA1 is the third voltage.

The first scan signal SCAN1 is at a high level, and the second transistor T2 is turned on under the control of the high level of the first scan signal SCAN1. The fourth scan signal SCAN4 is at a high level, and the sixth transistor T6 is turned on under the control of the high level of the fourth scan signal SCAN4. Therefore, the potential of the gate terminal of the sixth transistor T6 is charged to the third voltage and the first capacitor C1 is charged by the first data signal DATA1. The magnitude of the third voltage determines the magnitude of the driving current in the subsequent light-emitting stage.

In the fourth writing compensation stage t4, the first scan signal SCAN1 and the second scan signal SCAN2 are at a low level, the third scan signal SCAN3 and the fourth scan signal SCAN4 are at a high level, and the magnitude of the first data signal DATA1 is the fourth voltage.

The third scan signal SCAN3 is at a high level, and the fifth transistor T5 is turned on under the control of the high level of the third scan signal SCAN3. Therefore, the potential of the fourth node Q is charged to the fourth voltage by the first data signal DATA1, and the fourth node Q exists as a pull-down potential. In addition, the fourth scan signal SCAN4 is at a high level, and the sixth transistor T6 is turned on under the control of the high level of the fourth scan signal SCAN4, so as to transmit the third data signal DATA3 to the second node S.

In the light-emitting stage t5, the first scan signal SCAN1, the second scan signal SCAN2, the third scan signal SCAN3, and the fourth scan signal SCAN4 are all low potentials. The first transistor T1 is turned on, and the light-emitting device D emits light.

Further, in the light-emitting period, the light-emitting time control signal Sweep is generated by utilizing the coupling effect of the second capacitor C2. The on-time of the fourth transistor T4 is controlled by controlling the magnitude and duration of the frequency sweep voltage corresponding to the light-emitting time control signal Sweep. Then, the potential of the first node G is pulled down, causing the first transistor T1 to be turned off, thereby controlling the light-emitting duration of the light-emitting module.

On the other hand, the threshold voltage detection sub-module 1011 can detect the threshold voltage of the first transistor T1 through an external driving chip and compensate the data voltage corresponding to the first data signal DATA1. That is, the threshold voltages of the first transistor T1 and the fourth transistor T4 are independently compensated in the control module 103 and the threshold voltage detection sub-module 1011 respectively. Specifically, the detection process includes a writing stage t1 and a compensation stage t2 corresponding to the combination of the first scan signal SCAN1, the second scan signal SCAN2, the third scan signal SCAN3, and the fourth scan signal SCAN4.

Specifically, as shown in FIG. 5, in the writing stage t1, the second scan signal SCAN2 and the third scan signal SCAN3 are at a low level, and the first scan signal SCAN1 and the fourth scan signal SCAN4 are at a high level.

The first scan signal SCAN1 is at a high level, and the second transistor T2 is turned on under the control of the high level of the first scan signal SCAN1, so that the first data signal DATA1 is written into the first node G. The fourth scan signal SCAN4 is at a high level, and the sixth transistor T6 is turned on under the control of the high level of the fourth scan signal SCAN4, so that the third data signal DATA3 is written into the second node S.

In the detection stage t2, the second scan signal SCAN2, the third scan signal SCANS, and the fourth scan signal SCAN4 are at a low level, and the first scan signal SCAN1 is at a high level.

The first scan signal SCAN1 is at a high level, the second transistor T2 is turned on under the control of the high level of the first scan signal SCAN1, and the sixth transistor T6 is turned on. The first power supply terminal VDD charges the second node S until the sixth transistor T6 is turned off. The threshold voltage value of the sixth transistor T6 is stored in the first capacitor C1. The threshold voltage value is obtained through detection by an external driving chip, or the threshold voltage of the first transistor T1 is calculated by detecting the voltage of the second node S. Because the voltage of the second node S is equal to the difference between the original voltage value provided by the first data signal DATA1 and the threshold voltage of the first transistor T1, the detection is completed. The voltage value provided by the terminal of the adjusted first data signal DATA1 is the sum of the threshold voltage of the first transistor T1 and the original voltage value provided by the first data signal DATA1. This realizes the threshold voltage compensation of the first transistor T1.

The driving circuit provided by the embodiment of the present application enables the driving circuit to have a longer charging time by independently and simultaneously controlling the light-emitting time and the driving current of the light-emitting device D. Secondly, the demand for data bandwidth is not high, and it has a driving method similar to that of ordinary driving circuits. Again, threshold voltage drift and compensation issues in thin film transistors do not need to be considered. When the voltage of the second data signal DATA2 is appropriately large, the driving current is not sensitive to the threshold voltage. Finally, because the light-emitting device D emits light with a constant driving current, the wavelength drift issue of the light source of the light-emitting device D can be solved.

Figure 6:
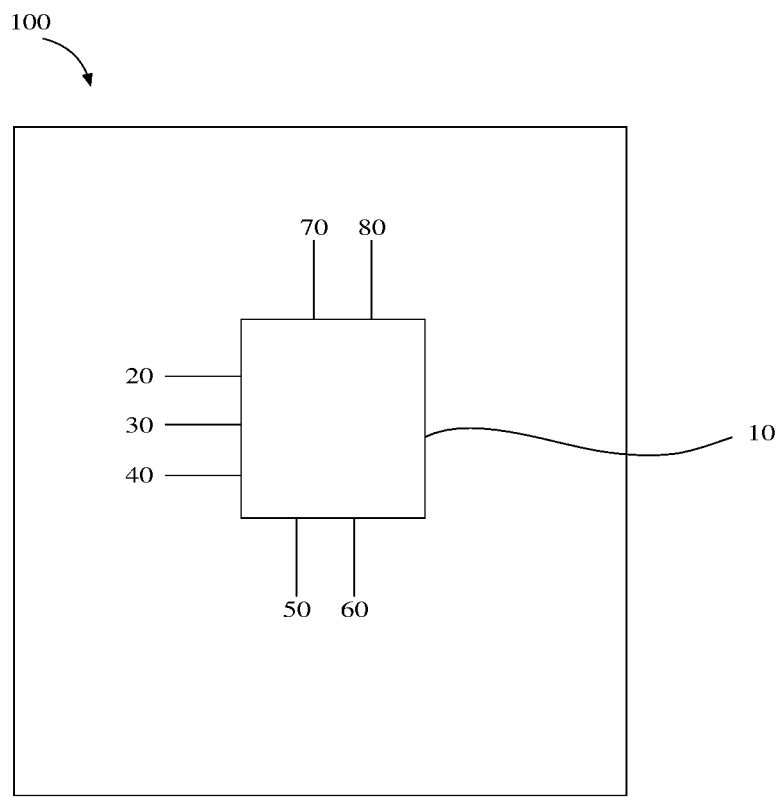
FIG. 6 is a schematic structural diagram of a backlight module provided by an embodiment of the present application.

Refer to FIG. 6, which is a schematic structural diagram of a backlight module provided by an embodiment of the present application. Embodiments of the present application further provide a backlight module 100, which includes a first data line 20, a first scan signal line 30, a second scan signal line 40, a third scan signal line 50, a fourth scan signal line 60, a second data signal lines 70, light-emitting time control signal lines 80 and the above driving circuit 10. The first data line 20 is used for providing the first data signal DATA1. The first scan signal line 30 is used for providing the first scan signal SCAN1. The second scan signal line 40 is used for providing the second scan signal SCAN2. The third scan signal line 50 is used for providing the third scan signal SCAN3. The fourth scan signal line 60 is used for providing the fourth scan signal SCAN4. The second data signal line 70 is used to provide a constant reference voltage. The light-emitting time control signal line 80 is used to provide the sweep voltage Sweep. The driving circuit 10, the first data line 20, the first scan signal line 30, the second scan signal line 40, the third scan signal line 50, the fourth scan signal line 60, the second data signal line 70, and the light-emitting time control signal line 80 are connected. The light-emitting device D can be mini-LED or micro-LED. For details of the driving circuit 10, reference may be made to the above description of the driving circuit, which will not be repeated here.

Figure 7:
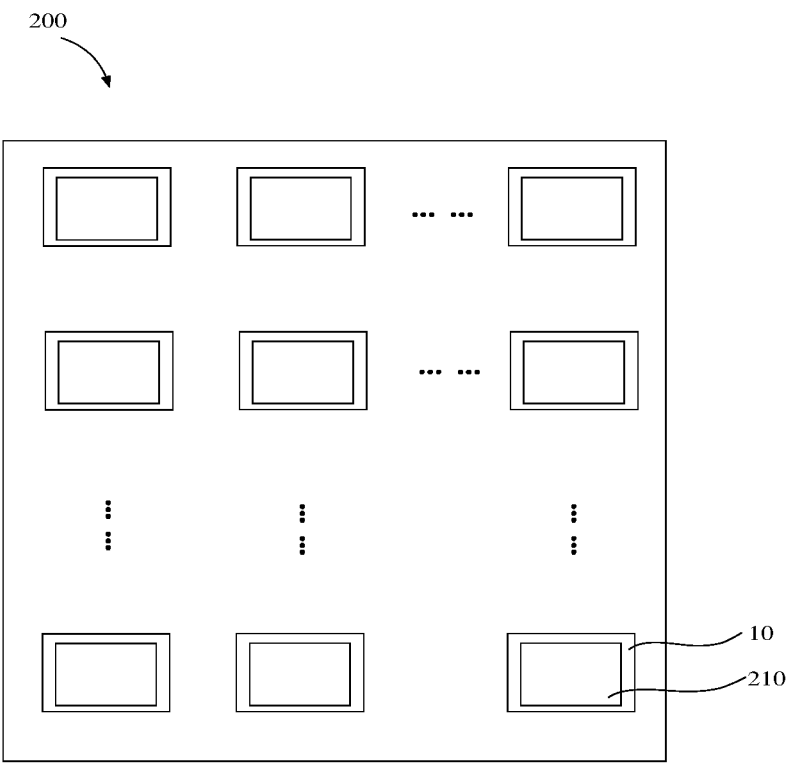
FIG. 7 is a schematic structural diagram of a display panel provided by an embodiment of the present application.

Refer to FIG. 7, which is a schematic structural diagram of a display panel according to an embodiment of the present application. Embodiments of the present application further provide a display panel 200 including a plurality of pixel units 210 arranged in an array. Each pixel unit 210 includes the above driving circuit 10. The light-emitting device D can be mini-LED or micro-LED. For details, reference may be made to the above description of the driving circuit 10, which will not be repeated here.

The display panel can be any product or component with display function, such as electronic paper, mobile phone, tablet computer, television, monitor, notebook computer, digital photo frame, and navigator.

A driving circuit, a display panel, and a driving method thereof provided by the embodiments of the present application have been described in detail above. Specific examples are used herein to illustrate the principles and implementations of the present application. The descriptions of the above embodiments are only used to help understand the method and the core idea of the present application. For those skilled in the art, according to the idea of the present application, there will be changes in the specific embodiments and application scope. In conclusion, the content of this specification should not be construed as a limitation on this application.

What is claimed is:

1. A driving circuit comprising:
   a light-emitting module, wherein the light-emitting module emits light under a driving of a driving current;
   a data signal writing module configured to receive a first data signal and a first scan signal, wherein the data signal writing module is connected to the light-emitting module and is configured to control a magnitude of the driving current; and
   a control module configured to receive a second data signal, a light-emitting time control signal, a second scan signal, and a third scan signal and electrically connected to the data signal writing module and the light-emitting module, wherein the control module is configured to control a light-emitting time of the light-emitting module under a control of the light-emitting time control signal;
   wherein the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node;
   wherein an anode of the light-emitting device is electrically connected to the second node, and a cathode of the light-emitting device is electrically connected to a second power supply terminal;
   wherein the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node;
   wherein the control module comprises a second capacitor, a third transistor, a fourth transistor, and a fifth transistor, one end of the second capacitor is configured to receive the light-emitting time control signal, and another end of the second capacitor is electrically connected to the third node;
   wherein a gate of the third transistor is configured to receive the second scan signal, a first electrode of the third transistor is electrically connected to the third node, and a second electrode of the third transistor is electrically connected between the data signal writing module and the light-emitting module;
   wherein a gate of the fourth transistor is electrically connected to the third node, a first electrode of the fourth transistor is electrically connected to the fourth node, and a second electrode of the fourth transistor is electrically connected to a second electrode of the third transistor is electrically connected;
   wherein a gate of the fifth transistor is configured to receive the third scan signal, a first electrode of the fifth transistor is configured to receive the second data signal, and a second electrode of the fifth transistor is electrically connected to the fourth node;
   wherein the first electrode of the second transistor and the first electrode of the fifth transistor are electrically connected to a fifth node, and the first data signal and the second data signal are a same signal.

2. The driving circuit of claim 1, wherein the light-emitting module further comprises a threshold voltage detection sub-module, the threshold voltage detection sub-module is configured to receive a fourth scan signal and a third data signal, and the threshold voltage detection sub-module is configured to detect a threshold voltage of the first transistor and compensate for a data voltage corresponding to the first data signal.

3. The driving circuit of claim 2, wherein the threshold voltage detection sub-module comprises a sixth transistor, a gate of the sixth transistor is connected to the fourth scan signal, a first electrode of the sixth transistor is configured to receives the third data signal, and a second electrode of the sixth transistor is electrically connected to the second node.

4. The driving circuit of claim 1, wherein the first transistor, the second transistor, the third transistor, the fourth transistor, and the fifth transistor are transistors of a same type.

5. A display panel comprising a plurality of pixel units arranged in an array, the pixel units comprising a driving circuit, the driving circuit comprising:
  a light-emitting module, wherein the light-emitting module emits light under a driving of a driving current;
  a data signal writing module configured to receive a first data signal and a first scan signal, wherein the data signal writing module is connected to the light-emitting module and is configured to control a magnitude of the driving current; and
  a control module configured to receive a second data signal, a light-emitting time control signal, a second scan signal, and a third scan signal and electrically connected to the data signal writing module and the light-emitting module, wherein the control module is configured to control a light-emitting time of the light-emitting module under a control of the light-emitting time control signal;
  wherein the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node;
  wherein an anode of the light-emitting device is electrically connected to the second node, and a cathode of the light-emitting device is electrically connected to a second power supply terminal;
  wherein the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node;
  wherein the control module comprises a second capacitor, a third transistor, a fourth transistor, and a fifth transistor, one end of the second capacitor is configured to receive the light-emitting time control signal, and another end of the second capacitor is electrically connected to the third node;
  wherein a gate of the third transistor is configured to receive the second scan signal, a first electrode of the third transistor is electrically connected to the third node, and a second electrode of the third transistor is electrically connected between the data signal writing module and the light-emitting module;
  wherein a gate of the fourth transistor is electrically connected to the third node, a first electrode of the fourth transistor is electrically connected to the fourth node, and a second electrode of the fourth transistor is electrically connected to a second electrode of the third transistor is electrically connected;
  wherein a gate of the fifth transistor is configured to receive the third scan signal, a first electrode of the fifth transistor is configured to receive the second data signal, and a second electrode of the fifth transistor is electrically connected to the fourth node;
  wherein the first electrode of the second transistor and the first electrode of the fifth transistor are electrically connected to a fifth node, and the first data signal and the second data signal are a same signal.

6. The display panel of claim 5, wherein the light-emitting module further comprises a threshold voltage detection sub-module, the threshold voltage detection sub-module is configured to receive a fourth scan signal and a third data signal, and the threshold voltage detection sub-module is configured to detect a threshold voltage of the first transistor and compensate for a data voltage corresponding to the first data signal.

7. The display panel of claim 6, wherein the threshold voltage detection sub-module comprises a sixth transistor, a gate of the sixth transistor is connected to the fourth scan signal, a first electrode of the sixth transistor is configured to receives the third data signal, and a second electrode of the sixth transistor is electrically connected to the second node.

8. The display panel of claim 5, wherein the first transistor, the second transistor, the third transistor, the fourth transistor, and the fifth transistor are transistors of a same type.

9. A driving method of a display panel, the display panel comprising a plurality of pixel units arranged in an array, the pixel units comprising a driving circuit, a driving method of the driving circuit comprising:
  controlling a conduction of a data signal writing module through a first data signal and a first scan signal, wherein the data signal writing module is connected to a light-emitting module and configured to control a magnitude of a driving current;
  controlling a conduction of a control module through a second data signal, a light-emitting time control signal, a second scan signal, and a third scan signal, wherein the control module is electrically connected to the data signal writing module and the light-emitting module, and the control module is configured to control a light-emitting time of the light-emitting module under a control of the light-emitting time control signal; and
  driving the light-emitting module to emit light by the driving current;
  wherein the light-emitting module comprises a first transistor and a light-emitting device, a first electrode of the first transistor is electrically connected to a first power supply terminal, a gate of the first transistor is electrically connected to a first node, and a second electrode of the first transistor is electrically connected to a second node;
  wherein an anode of the light-emitting device is electrically connected to the second node, and a cathode of the light-emitting device is electrically connected to a second power supply terminal;
  wherein the data signal writing module comprises a second transistor and a first capacitor, a gate of the second transistor is configured to receive the first scan signal, the first electrode of the second transistor is configured to receive the first data signal, a second electrode of the second transistor is connected to the first node; one end of the first capacitor is electrically connected to the first node, and another end of the first capacitor is electrically connected to the second node;

wherein the control module comprises a second capacitor, a third transistor, a fourth transistor, and a fifth transistor, one end of the second capacitor is configured to receive the light-emitting time control signal, and another end of the second capacitor is electrically connected to the third node;

wherein a gate of the third transistor is configured to receive the second scan signal, a first electrode of the third transistor is electrically connected to the third node, and a second electrode of the third transistor is electrically connected between the data signal writing module and the light-emitting module;

wherein a gate of the fourth transistor is electrically connected to the third node, a first electrode of the fourth transistor is electrically connected to the fourth node, and a second electrode of the fourth transistor is electrically connected to a second electrode of the third transistor is electrically connected;

wherein a gate of the fifth transistor is configured to receive the third scan signal, a first electrode of the fifth transistor is configured to receive the second data signal, and a second electrode of the fifth transistor is electrically connected to the fourth node;

wherein the first electrode of the second transistor and the first electrode of the fifth transistor are electrically connected to a fifth node, and the first data signal and the second data signal are a same signal.

10. The driving method of the display panel of claim 9, wherein the light-emitting module further comprises a threshold voltage detection sub-module, the threshold voltage detection sub-module is configured to receive a fourth scan signal and a third data signal, and the threshold voltage detection sub-module is configured to detect a threshold voltage of the first transistor and compensate for a data voltage corresponding to the first data signal.

11. The driving method of the display panel of claim 10, wherein the threshold voltage detection sub-module comprises a sixth transistor, a gate of the sixth transistor is connected to the fourth scan signal, a first electrode of the sixth transistor is configured to receives the third data signal, and a second electrode of the sixth transistor is electrically connected to the second node.

12. The driving method of the display panel of claim 9, wherein the first transistor, the second transistor, the third transistor, the fourth transistor, and the fifth transistor are transistors of a same type.

\* \* \* \* \*